US008808774B2

(12) United States Patent
Falkenberg et al.

(10) Patent No.: US 8,808,774 B2
(45) Date of Patent: Aug. 19, 2014

(54) PKA BUFFERED FLAVOR ENHANCED REDUCED MOISTURE FRUITS AND VEGETABLES

(75) Inventors: Ricky L. Falkenberg, Turlock, CA (US); Harold L. Archibald, Fairfield, CA (US); Danford Wilkinson, Benicia, CA (US); Lisa L. Trexler, Winchester, CA (US)

(73) Assignee: Scientific Food Solutions, LLC, Fairfield, CA (US)

( * ) Notice: Subject to any disclaimer, the term of this patent is extended or adjusted under 35 U.S.C. 154(b) by 1790 days.

(21) Appl. No.: 11/424,869

(22) Filed: Jun. 17, 2006

(65) Prior Publication Data

US 2007/0259080 A1 Nov. 8, 2007

Related U.S. Application Data

(60) Provisional application No. 60/595,258, filed on Jun. 20, 2005.

(51) Int. Cl.
*A23L 3/3553* (2006.01)
*A23L 3/358* (2006.01)
*A23L 3/3544* (2006.01)

(52) U.S. Cl.
CPC ............ *A23L 3/3553* (2013.01); *A23L 3/358* (2013.01); *A23L 3/3544* (2013.01)
USPC ............. 426/310; 426/547; 426/73; 514/461; 424/687; 424/663; 424/601

(58) Field of Classification Search
CPC ..... A61K 31/341; A23L 3/3553; A23L 3/358
USPC ............ 514/461; 426/310, 73; 424/687, 663, 424/601

See application file for complete search history.

(56) References Cited

U.S. PATENT DOCUMENTS 6,451,341 B1 * 9/2002 Slaga et al. .................. 424/468

* cited by examiner

*Primary Examiner* — Jeffrey S. Lundgren
*Assistant Examiner* — Meghan Finn
(74) *Attorney, Agent, or Firm* — Jeffer Mangels Butler & Mitchell LLP

(57) ABSTRACT

The described pKa process creates a unique combination of active ingredients. The calcium carbonate carrier is impregnated with various proportions of active ingredients and the compounds are made more effective by the sheer and absorption action as they are combined in the described process. The calcium carrier is adjusted to incorporate small amounts of highly efficient/effective pH adjusters. No natural solution exists in Nature with a pH of 10.6 that is optimal for adjusting the pKa naturally in foods. The present invention effects a change in the pKa of most acids and therefore impacts pH which can positively affect flavor, color and taste. The reduced moisture process in combination with the invention solution applied as a treatment results in fruits and vegetables that exhibit cleaner flavors, better texture, enhanced color and lower microbial counts than is found in standard IQF vegetables currently available.

13 Claims, 3 Drawing Sheets

SHUGI: Schematic and Process Flow for the desired invention:

SHUGI: Overall System Flow for the desired invention:

PROCESS FLOW DIAGRAM

PKA BUFFERED FLAVOR ENHANCED REDUCED MOISTURE FRUITS AND VEGETABLES

CROSS-REFERENCE TO RELATED APPLICATIONS

This application claims the benefit under 35 USC 119(e) of U.S Provisional Application No. 60/595,258, filed Jun. 20, 2005. This application is also a continuation-in-part of U.S. patent application Ser. No. 11/423,728 filed Jun. 13, 2006 and U.S. patent application Ser. No. 11/382,051, filed May 7, 2006, which claims the benefit of U.S. Provisional Application No. 60/595,072, filed Jun. 3, 2005.

FIELD OF INVENTION

The field of invention relates generally to a combination of partial drying and quick-freezing which adds unique and functional benefits to frozen fruits and vegetables. Partial drying removes surface moisture with little or no shriveling while reducing weight and concentrating flavor and color. Smaller and fewer ice crystals are generated resulting in minimal cell structure damage and prevents the development of free moisture (weeping, purging or syneresis) upon thawing.

Additional functional benefits for flavor, color and texture of reduced moisture fruits and vegetables are achieved by modifying the natural pH via altering the pKa, hydrogen ion balance, acidity and solids of the incoming raw material prior to processing into reduced moisture frozen fruits and vegetables.

The slight modification of weak acids via this invention improves the overall flavor and allows weaker flavors to be generated which were masked by the stronger acids naturally occurring in the vegetable pieces.

DETAILED DESCRIPTION OF THE INVENTION

Figure 1:
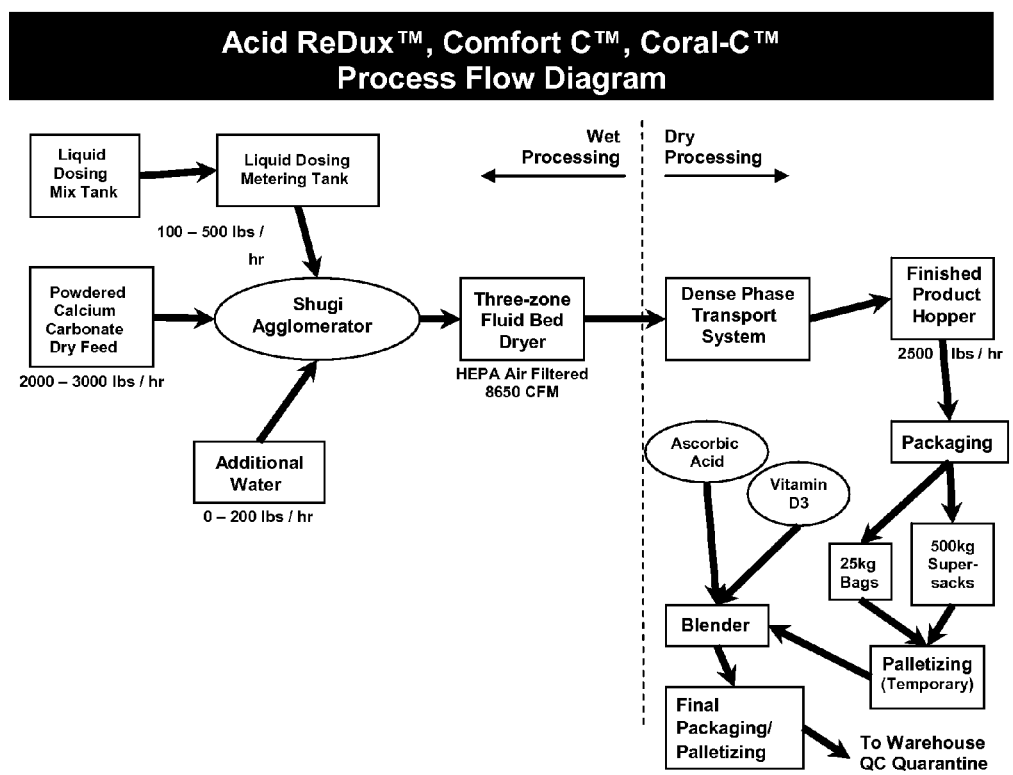
FIG. 1 SHUGI PROCESS FLOW DIAGRAM, shows process flow from wet processing into dry processing with final product being held by QA until all process records and laboratory results are reviewed.
Figure 2:
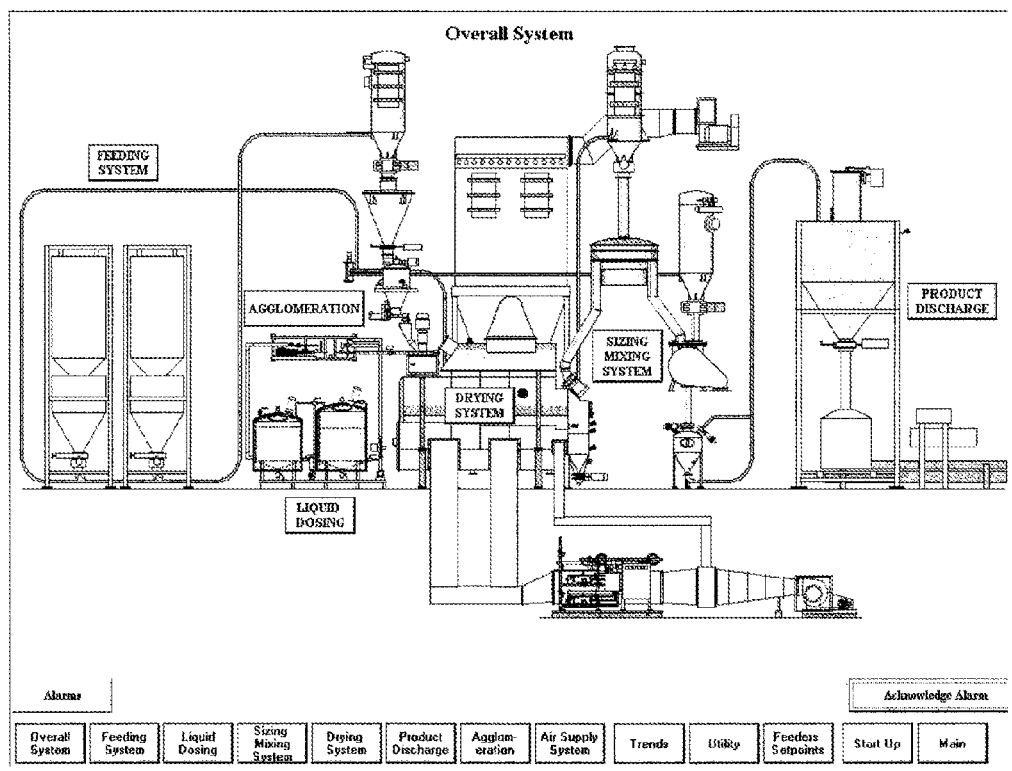
FIG. 2 SHUGI OVERALL PROCESS SYSTEM FLOW, for the present invention.
Figure 3:
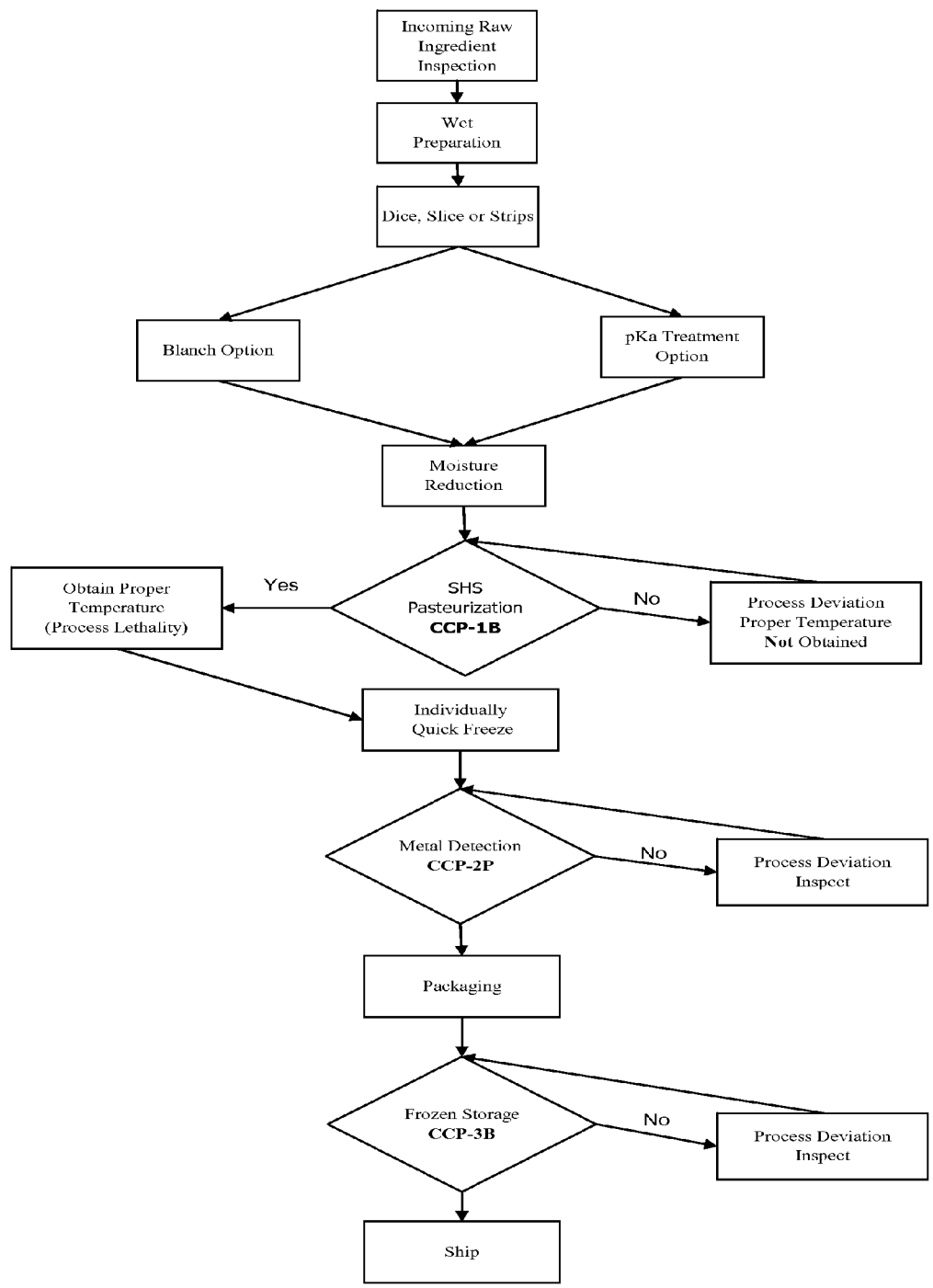
FIG. 3 FRUIT/VEGETABLE PROCESS FLOW, showing the application of the present invention.

The process for additional functional benefits is achieved by incorporating various solutions that are applied to the cut fruits and vegetables prior to moisture reduction and individual quick freezing.

The application of the solutions utilizes a spray system to lightly coat the individual fruit and vegetable pieces at a concentration of 0.006% to 1.5%. The application rates and solutions vary by vegetable and fruit as well as piece size. The incoming raw material is tested for solids, total acidity and pH. Solutions are prepared to meet the desired finished product attributes for color, flavor, texture, solids, pH, total acidity and syneresis. The pH (acidity) targets are established for each finished product in a range from 2.5% to 25.0%. Solids targets are established for each product to achieve a 10.0% to 150.0% increase in solids and free moisture removal.

The raw material is prepared using conventional methods for sorting, washing and sizing. The solutions are prepared and constantly mixed utilizing industry standardized tanks, pumps and nozzles for application to the fruits and vegetables. The treatment solutions are applied by spray nozzles as the prepared raw material passes under them on a standard conveyor belt. The use of calcium chloride to improve the texture and firmness of vegetables is well know and commonly used in tomato processing and some other vegetables. The resulting off flavors from calcium chloride is recognized and to date no solution has been found to achieve the texture with out some off flavors being generated. The proposed invention combines several process treatments and a flavor modifying solution to achieve the textures and desired flavors of the finished fruits and vegetables.

The complete process requires 5 steps to achieve the pH buffering, pKa acid balance, solids, color, flavor and texture improvement.

(1) Examples 1, 2 and 3 show USP mineral powders that are dry blended by weight. Spray dried in a Shugi, FilterMat or other acceptable agglomerator to less than 5.0% moisture into a firm granule. Dry blend in 5.10% DC ascorbic acid and 0.20% vitamin $D_3$.

(2) Combine the finished agglomerated blend into a solution of 37.0% $CaCl_2$ at 0.002% to 0.004% by weight. This mixture is continuously agitated to insure good mixing and uniformity of the formula.

(3) This mixture is sprayed onto the prepared vegetables or fruits to achieve a 0.7 to 1.5% solution.

(4) Partial drying is achieved utilizing a belt dryer, bin dryer or tray dryer to reduce moisture from 10% to 50% of the incoming free moisture of the treated fruit or vegetable. The finished vegetable will have a solids level that is 40 to 50% greater than the initial raw material. e.g., tomato: incoming solids 5.5% finished solids 10.0 to 12.5%

(5) The treated and partially dried fruit or vegetable pieces are passed through a specialized hot air pasteurization unit to achieve a microbiological reduction process lethality) step of >15,000 total plate count prior to individual quick freezing. This insures that the vegetable piece is free of pathogens and results in a significant reduction of bacteria commonly found in process fruits and vegetables.

This process has been successfully tested and used on tomato, broccoli, eggplant, cauliflower, green and yellow zucchini, green, red and yellow bell pepper, jalapeno, green chili, strawberry, peach and apricot. The resulting finished products exhibited higher solids (10.0% to 40.0%), a pH change of (10.0% to 40.0%), better color, flavor and texture. The products were further tested in various formulas and applications where better retention of these characteristics was desired. The treated products held up better under additional thermal reprocessing, refreezing, in shelf stable refrigerated applications and in a thawed state for immediate consumption.

The vitamin C and vitamin D function to improve the absorption of CaCO3, MgOH and KOH into the vegetable pieces to improve texture and balance acid/alkalinity. This absorption is accelerated as a result of the oxidative prosperities of the hydrogen ions reaction with natural mineral composition of the vegetables. $CaCl_2$ and CaCO3 fortified with MgOH, KOH protect the cell structure and improve the texture and firmness of the vegetable piece during the partial removal of free water in the drying process and during freezing. Each vegetable has a targeted free moisture removal in the drying process to concentrate the flavor, color and texture prior to freezing. (Provide Chart by Vegetable)

The $CaCO_3$, MgOH, KOH, is used to alter the pKa and thus reduces the pH and neutralize the bitter taste of $CaCl_2$ resulting in an improve flavor balance in the finished vegetable pieces. This balance is exhibited in a smoother and fresher flavor than conventionally processed vegetables. The astringent flavor note typically detected in frozen or thermally processed vegetables utilizing $CaCl_2$, citric acid or other calcium based minerals to improve texture is absent.

Gum acacia acts as a binder for the minerals and insures an even distribution during dilution into the liquid media to be applied to the vegetables. The binder does not precipitate during dilution and aids in the even distribution of the pKa modifier to the vegetables during processing.

EXAMPLE 1

In this example of the present invention, a specific formulation was tested on reduced moisture vegetables with SHS sterilization treatment in a 5 step process prior to individual quick freezing to improve flavor, texture, and color with optimal results.

| Order | Ingredient | Percent by weight |
|---|---|---|
| 1 | Calcium carbonate | 80.18 |
| 2 | Magnesium Hydroxide | 7.77 |
| 3 | DC Ascorbic Acid | 5.00 |
| 4 | Gum *Acacia* | 4.76 |
| 5 | Potassium Hydroxide | 1.99 |
| 7 | Vitamin $D_3$ | 0.30 |

EXAMPLE 2

This example of the present invention, a variation of a specific formulation was tested on reduced moisture vegetables with SHS sterilization treatment in a 5 step process prior to individual quick freezing to improve flavor, texture, and color with acceptable results.

| Order | Ingredient | Percent by weight |
|---|---|---|
| 1 | Calcium carbonate | 78.78 |
| 2 | Magnesium Hydroxide | 7.77 |
| 3 | DC Ascorbic Acid | 5.00 |
| 4 | Gum *Acacia* | 4.76 |
| 5 | Potassium Hydroxide | 1.99 |
| 6 | Phosphorous | 1.40 |
| 7 | Vitamin $D_3$ | 0.30 |

EXAMPLE 3

This example of the present invention, another variation of the specific formulation was also tested on reduced moisture vegetables with SHS sterilization treatment in a 5 step process prior to individual quick freezing to improve flavor, texture, and color with exceptional results.

| Order | Ingredient | Percent by weight |
|---|---|---|
| 1 | Calcium carbonate | 79.10 |
| 2 | Magnesium Hydroxide | 7.20 |
| 3 | Gum *Acacia* | 4.77 |
| 4 | DC Ascorbic Acid | 3.00 |
| 5 | Phosphorous | 2.00 |
| 6 | Potassium Hydroxide | 1.98 |
| 7 | Potassium bicarbonate | 1.65 |
| 8 | Vitamin $D_3$ | 0.30 |

What is claimed is:

1. A method for treating fruits or vegetables, the method comprising the steps of:
   blending calcium carbonate, magnesium hydroxide, ascorbic acid, gum acacia, potassium hydroxide and vitamin $D_3$ to produce a blend, wherein the blend comprises 80.18% by weight of calcium carbonate, 7.77% by weight of magnesium hydroxide, 5.0% by weight of ascorbic acid, 4.76% by weight of gum acacia, 1.99% by weight of potassium hydroxide and 0.30% by weight of Vitamin $D_3$
   contacting the blend with a solution of $CaCl_2$ to produce a blend solution,
   applying the blend solution to a fruit or vegetable to produce a treated fruit or vegetable,
   at least partially drying the treated fruit or vegetable, and pasteurizing the treated fruit or vegetable.

2. The method of claim 1 wherein the blend solution is sprayed onto the fruit or vegetable.

3. The method of claim 1 wherein the blend includes phosphorous.

4. The method of claim 3 wherein the blend includes potassium bicarbonate.

5. A composition comprising 80.18% by weight of calcium carbonate, 7.77% by weight of magnesium hydroxide, 5.0% by weight of ascorbic acid, 4.76% by weight of gum acacia, 1.99% by weight of potassium hydroxide and 0.30% by weight of vitamin $D_3$.

6. A composition comprising 78.78% by weight of calcium carbonate, 7.77% by weight of magnesium hydroxide, 5.0% by weight of ascorbic acid, 4.76% by weight of gum acacia, 1.99% by weight of potassium hydroxide, 1.40% by weight of phosphorous and 0.30% by weight of vitamin $D_3$.

7. A composition comprising 79.10% by weight of calcium carbonate, 7.20% by weight of magnesium hydroxide, 3.0% by weight of ascorbic acid, 4.77% by weight of gum acacia, 1.98% by weight of potassium hydroxide, 2.0% by weight of phosphorous, 1.65% of potassium bicarbonate and 0.30% by weight of vitamin $D_3$.

8. A solution comprising the composition of claim 5 in a 37.0% by weight solution of $CaCl_2$.

9. The solution of claim 8 wherein the total concentration of calcium carbonate, magnesium hydroxide, ascorbic acid, gum acacia, potassium hydroxide and vitamin $D_3$ in the solution ranges from 0.006% to 1.5% by weight.

10. A method for treating fruits or vegetables, the method comprising the steps of:
    blending calcium carbonate, magnesium hydroxide, ascorbic acid, gum acacia, potassium hydroxide, phosphorous and vitamin $D_3$ to produce a blend, wherein the blend comprises 78.78% by weight of calcium carbonate, 7.77% by weight of magnesium hydroxide, 5.0% by weight of ascorbic acid, 4.76% by weight of gum acacia, 1.99% by weight of potassium hydroxide, 1.40% by weight of phosphorous and 0.30% by weight of Vitamin $D_3$,
    contacting the blend with a solution of $CaCl_2$ to produce a blend solution,
    applying the blend solution to a fruit or vegetable to produce a treated fruit or vegetable,
    at least partially drying the treated fruit or vegetable,
    and pasteurizing the treated fruit or vegetable.

11. The method of claim 10, wherein the blend solution is sprayed onto the fruit or vegetable.

12. A method for treating fruits or vegetables, the method comprising the steps of:

blending calcium carbonate, magnesium hydroxide, ascorbic acid, gum acacia, potassium hydroxide, phosphorous, potassium bicarbonate and vitamin $D_3$ to produce a blend, wherein the blend comprises 79.10% by weight of calcium carbonate, 7.20% by weight of magnesium hydroxide, 3.0% by weight of ascorbic acid, 4.77% by weight of gum acacia, 1.98% by weight of potassium hydroxide, 2.0% by weight of phosphorous, 1.65% of potassium bicarbonate and 0.30% by weight of Vitamin $D_3$, contacting the blend with a solution of $CaCl_2$ to produce a blend solution, applying the blend solution to a fruit or vegetable to produce a treated fruit or vegetable, at least partially drying the treated fruit or vegetable, and pasteurizing the treated fruit or vegetable.

13. The method of claim 12, wherein the blend solution is sprayed onto the fruit or vegetable.

* * * * *